Patented Dec. 7, 1937

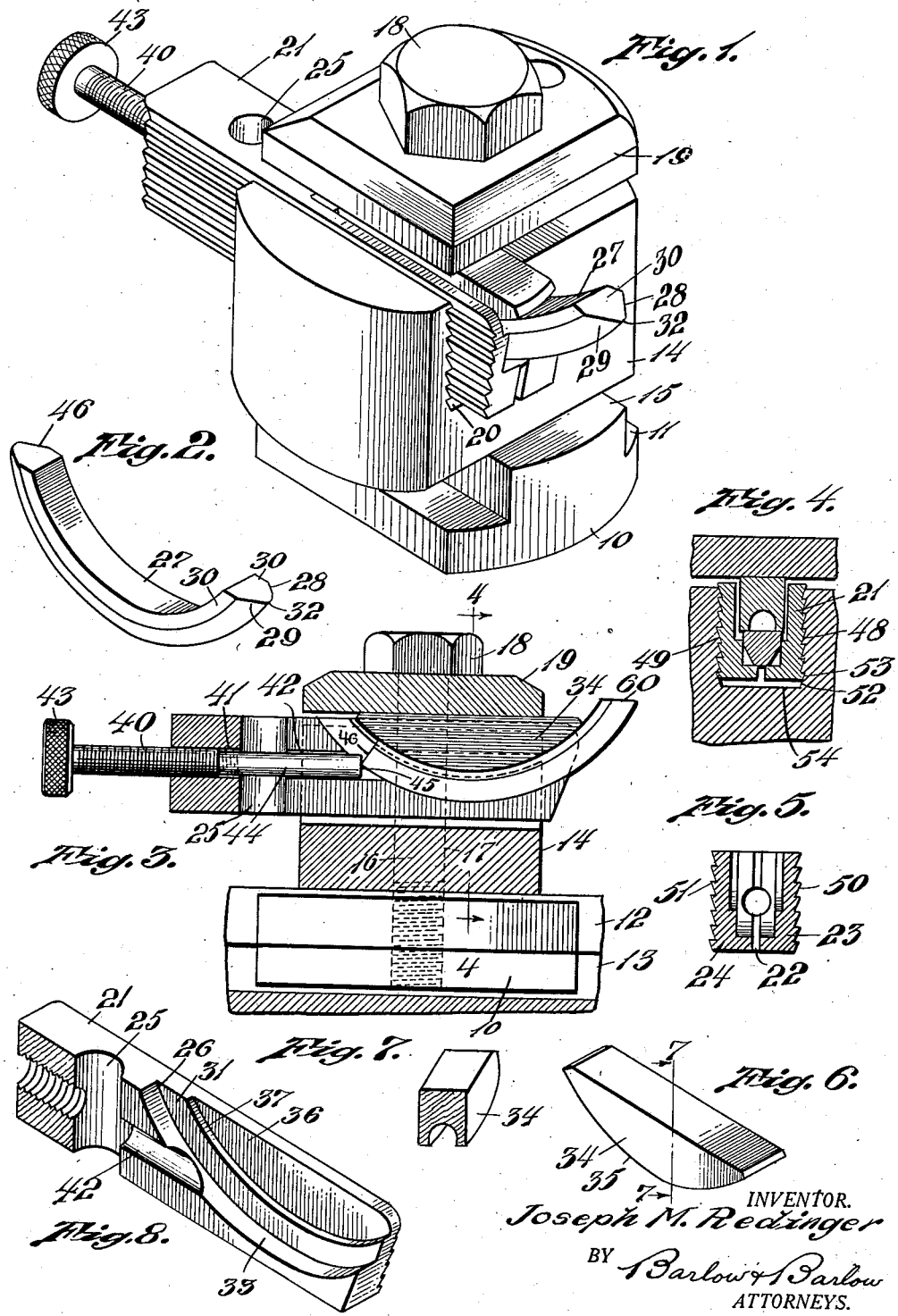

2,101,158

UNITED STATES PATENT OFFICE 2,101,158

LATHE TOOL AND HOLDER THEREFOR

Joseph M. Redinger, Johnston, R. I.

Application April 23, 1936, Serial No. 75,948

5 Claims. (Cl. 29—101)

This invention relates to a tool and the tool post of a lathe for mounting the same; and has for one of its objects the provision of a tool which can be much more easily sharpened than rectilinear tools of rectangular cross section which are in common use at the present time.

Another object of the invention is the shaping of the tool so that the cutting away of a considerable portion of the expensive tool stock is materially reduced.

Another object of the invention is the provision of a tool on the arc of a circle so that for sharpening the tool only the end of the tool needs to be ground in a single plane, except possibly for the grinding away of scale which may have accumulated on the surface of the tool about its cutting edge.

Another object of the invention is the reduction of the leverage and thus the pressure which is exerted on the tool post by being transmitted from the tool.

Another object of the invention is the provision of a tool which will be so arranged that more power may be exerted through the tool for the cut required.

Another object of the invention is the arrangement of a tool which can be advanced by threaded means even though it be on the arc of a circle and moving through a path different from the path of a screw operating it.

With these and other objects in view, the invention consists of certain novel features of construction, as will be more fully described, and particularly pointed out in the appended claims.

In the accompanying drawing:

Fig. 1 is a perspective view of a tool post with the tool holder and tool therein of my invention;

Fig. 2 is a perspective view of the tool;

Fig. 3 is a sectional view taken longitudinally through the tool holder;

Fig. 4 is a sectional view on substantially the line 4—4 of Fig. 3;

Fig. 5 is a sectional view through the tool holder alone;

Fig. 6 is a perspective view of the pressure block through which pressure is exerted on the tool for holding it in position;

Fig. 7 is a perspective view of a fragmental part of the block shown in Fig. 6 and on substantially line 7—7 of Fig. 6;

Fig. 8 is a sectional view through the tool holder, the same being shown in perspective.

Tools for lathes which are in general commercial use are rectangular in cross section, and the tool stock is usually rectilinear or straight, from which the desired shape of the tool is formed by grinding presenting somewhat of a point cut away beneath the point for clearance, all of which requires the removal of a considerable amount of stock.

Tool stock is rather expensive and is purchased by weight, and in order to afford a saving in the stock I have so shaped the cross section of a length of tool stock as to form the same generally triangularly in cross section thereby reducing the weight of the stock per linear unit of length, and I shape a tool holder on the arc of a circle of such a radius that the upper end of the stock is substantially at the desired height, whereby by reason of the cross sectional shape of the stock and facing off its end on substantially the radius of the arc, I acquire a point on the tool and an undercut therefrom without grinding away any of the stock, whereby the labor of grinding is eliminated, as sharpening merely requires the facing off of a plain surface across the end of the stock and possibly grinding slightly along the outer surface below the top end to remove the scale. By the use of my improved tool holder I am enabled to retain the tool firmly and rigidly in position which by reason of the angle at which it projects upwardly shortens the leverage and therefore increases the firmness with which the tool is held whereby a heavier cut in the work may be had; and the following is a more detailed description of the present embodiment of this invention illustrating the preferred means by which these advantageous results may be accomplished.

With reference to the drawing, the tool post is similar in many respects to the tool post shown in somewhat more detail in my co-pending application Serial No. 72,010, in which 10 designates the base of the tool post which is recessed as at 11 on either side to receive the overhanging portions 12 of the undercut slideways 13 in the carriage of the lathe in which the tool post is mounted. The body portion 15 rests upon the upper surface of the base and may be moved towards the base to bind the same on the overhanging portion 12, as will be presently described.

A bolt 16 which is in threaded engagement with the base extends upwardly through an opening 17 in the body and is headed as at 18 the under surface of which head engages a capping plate 19 for exerting pressure to bind the tool and its holder in position and also clamp the body 14 to the overhanging portion 12 by drawing the base and body toward each other. When this bolt is loosened, the body may, of course, swivel about the bolt as an axis with reference to the base.

A recess 20 is provided in the body 14 for the reception of a tool holder 21, which holder is split longitudinally as at 22 providing portions 23, 24 which may be urged toward each other against their inherent resilient tendency to remain separated. This split terminates in an opening 25 spaced from the rear end of the tool holder 21. The tool holder is provided with an arcuate seat 26 on either side of the split 22 for the reception of a tool 27 shaped as best shown in perspective in Fig. 2. The tool is generally elongated having a cross section with converging sides 28 and 29 forming somewhat the shape of a triangle, although flattened as at 30 at the base of the triangle to provide surfaces parallel to each other which would engage the side walls 31 of the recess 26, while there is a flattened portion 32 at the apex of the triangle which would engage the flat surface 33 of the recess 26 provided in the tool holder to be guided therealong. This tool 27 being generally arcuate along parallel lines receives the block 34 having a lower arcuate surface 35 to rest on top of the tool, as clearly shown in Fig. 3. The block 34 is wider than the tool 27 and is received in the enlarged portion 36 of the upper portion of the recess 26, there being a shoulder 37 provided in the side walls 31 by reason of the different sizes of the recess 26, this shoulder serving to support the block 34 when the tool is in a very advanced position or nearly used up.

A threaded member 40 engages a threaded opening 41 in the back of the tool holder, which opening extends longitudinally thereof and is unthreaded in its forward portion 42 which intersects the recess 26 in the tool holder. This threaded member 40 has a knurled handle portion 43 for conveniently turning the same, while its unthreaded forward end 44 has an abutment end 45 to engage the end 46 of the tool for moving it forwardly in its tool holder, as will be clearly apparent from the showing of Fig. 3.

The opposite side walls 48 and 49 of the recess 20 and the opposite side walls 50 and 51 of the tool holder are provided with interfitting serrations. These serrations present engaging surfaces as 52 and 53 which are inclined toward the opposite side walls of the recess and each of these surfaces is tapered towards the bottom wall 54 of the recess, thus should the tool holder 21 be moved downwardly in the recess the inclined surfaces which are in parallel planes would tend to move the opposite walls of the tool holder toward each other and decrease the size of the split 22 so as to cause a binding upon any tool in the recess 26 in the tool holder.

In order to obtain such a binding movement, the head 18 of the bolt 16 is turned in a direction to cause the same to move downwardly, pressure is thus applied to the top plate 19 which in turn is transmitted to the block 34 and in turn to the tool which is bound by the block 34 and then to the tool holder which is moved downwardly in the recess 20 and the tool additionally bound by sidewise pressure. This pressure in turn forces the body portion 14 downwardly against the top surface of the overhang 12 while drawing up the base 10 so that its cut away portion 11 will engage the under surface of the overhang 12 and the entire structure will be firmly bound in position. Of course, when the bolt is loosened, the tool, the body, or the tool holder may each be adjusted to their desired positions.

By the arrangement of the tool on the arc of a circle it extends upwardly at an angle which may be best seen in Fig. 3 and which angle is a position as to best withstand the thrust of the pressure which is exerted upon it when cutting. Also, by this arrangement due to the arc of curvature, the tool has clearance beneath its cutting edge so as to avoid interference with the work and by the reason of the shape of the tool of generally triangular formation, it is merely necessary to grind the surface 60 of the tool in sharpening, although scale material may be removed from the surfaces 28 and 29 if found thereon.

The expense of sharpening a tool is decreased; the weight of the tool is decreased per linear unit of measure, and yet the useful length is provided.

The angular arrangement shortens the leverage between the point of grip of the tool and its cutting edge, making the same more rigidly held in the tool post and thus providing a better tool from the point of operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In combination, a tool holder provided with an arcuate guide channel and a tool having an arcuate shape to fit said channel, means for relatively moving the opposite sides of the channel to bind the tool in adjusted position therein, a block arcuate on its lower surface engaging the upper surface of said tool, and means engaging said block for forcing said tool towards said guide to hold the same in adjusted position.

2. In combination, a tool holder having resiliently connected side walls provided with an arcuate guide channel therebetween and a tool having an arcuate shape to fit said channel, means for relatively moving the said walls to bind the tool in adjusted position therebetween, a block arcuate on its lower surface engaging the upper surface of said tool, and means engaging said block for forcing said tool towards said guide to hold the same in adjusted position.

3. In combination, a tool of elongated dimension disposed on the arc of a circle and of a cross section with its sides converging at one side to provide a generally triangular shape and merging into parallel short sides, a holder for said tool having an arcuate rest and guide with parallel walls for engaging said short side of the tool, and means for binding said tool in said holder by engagement of the parallel surfaces.

4. In combination, a tool holder having resiliently connected side walls provided with an arcuate guide channel therebetween, a tool having an arcuate shape to fit said channel, a member arcuate on its lower surface extending into said channel and engaging said tool, means for applying pressure to and through said member to move said holder, and means responsive to the movement of the holder to move the side walls of the holder toward each other.

5. In combination, a tool holder having resiliently connected side walls provided with an arcuate guide channel therebetween, a tool having an arcuate shape to fit said channel, a member arcuate on its lower surface extending into said channel and engaging said tool, means for applying pressure to and through said member to move said holder, means responsive to the movement of the holder to move the side walls of the holder toward each other, and a threaded member in said tool holder entering said channel to engage and advance said tool.

JOSEPH M. REDINGER.